May 11, 1926.
A. WEICKMAN
SPRING SEAT
Filed May 5, 1925
1,584,577
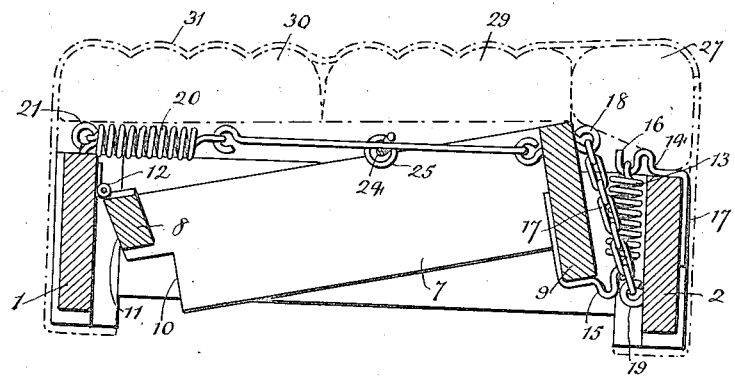
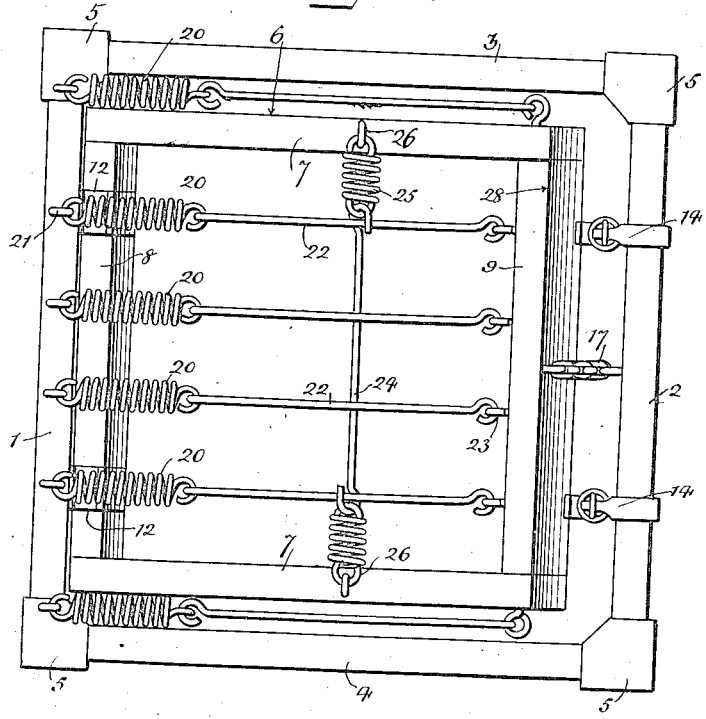
WITNESSES
H. T. Walker
Harry E. Seidel
INVENTOR
A. Weickman
BY Munn & Co
ATTORNEYS Patented May 11, 1926.

1,584,577

UNITED STATES PATENT OFFICE.

ALBERT WEICKMAN, OF HARRISON, NEW YORK.

SPRING SEAT.

Application filed May 5, 1925. Serial No. 28,146.

This invention relates to seat cushions for chairs or vehicles, and has for its object the provision of a seat having a frame resiliently supported so that an occupant of the seat will assume a correct and comfortable position.

A further object of the invention is the provision of a device having a resiliently supported frame in which the forward portion of the frame is adapted to move more readily than the rear portion, thereby providing a differential movement between the forward and rear portions of the seat for the purpose of evenly distributing the weight of the body on said seat.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a transverse vertical section of a seat constructed according to the principle of my invention.

Fig. 2 is a plan view of the frame supporting the cushion of the seat.

Referring more particularly to the drawings, a rigid frame is provided having front and rear bars 1 and 2 respectively and side bars 3 and 4. These bars have their adjacent ends connected to posts 5 located at each corner. The frame may be of any design to accommodate the seat to various forms and sizes of chairs or seats in vehicles. Located within the first mentioned frame is a second frame generally designated by the numeral 6 and of smaller dimensions than the first frame so that the second frame may be oscillated within the first frame. This frame has side bars 7, rear bars 8 of less width than the side bars 7, and a front bar 9 which is of greater width than either the side bars or the rear bar. The side bars 7 are cut away, as shown at 10, and are sheared off at an angle, as shown at 11, so that the side bars may assume a horizontal position without interference of the rear ends of the side bars when coacting with the rear bar 1 of the main frame. The rear bar 8 is hinged, as shown at 12, to the rear bar 1 of the main frame.

The forward end of the auxiliary or second frame is located in a higher horizontal plane than the rear portions of the auxiliary frame and is maintained in such position by coil springs 13 suspended at one end by means of brackets 14 and connected to the lower end of the front bar 9 by means of brackets 15. The brackets 14 and 15 are similar in construction and are provided at their free ends with a hook 16, with the rear end of the bracket forming a strap 17 which is bent around either the front bar 2 of the main frame or the front bar 9 of the auxiliary frame and secured to said bars in any approved manner. The springs 13 tend always to maintain the forward end of the frame 6 in an elevated position, but the elevation of the frame 6 is restricted by means of a chain 17 connected to a screw eye 18 secured to the bar 9, and a screw eye 19 secured to the bar 2.

A plurality of spaced coil springs 20 are secured at one end to screw eyes 21 mounted in the rear bar 1 of the main frame, and the other end of each spring is connected to a link 22. The forward ends of the links are each connected to a screw eye 23 secured on the inner face of the front bar 9 of the supporting or movable frame 6. It will be noted that coil springs 20 will also tend to elevate the forward end of the movable frame 6. In order to reinforce the central portions of the links 22, a transverse link 24 is disposed transversely of the links 22, with its ends connected by means of coil springs 25 to screw eyes 26 secured in the side bars 7 of the movable frame 6.

A cushion 27 is placed upon the forward end of the main frame and terminates at its rear edge in a plane which is in line with the front edge 28 of the bar 9 of the movable frame 6. A second cushion 29 is seated upon the movable frame 6 and rests upon the links 22 and 24. A third cushion 30 is placed transversely of the main frame and rests upon the coil springs 20 and the rear ends of the links 22. A cover 31 is placed entirely around the main frame and flat cushions 27, 29 and 30 and secured at its lower ends to the main frame.

When a weight is placed upon the cushion, the rear cushion 30 and the rear portion of cushion 29 will exert a force downwardly on the coil springs 20 and the links 22, while the weight will exert a downward pressure at the forward end of the seat on the movable end of the auxiliary frame 16 so that the front portion of the frame will tend to move downwardly under a predetermined weight which is resisted by the coil springs 20 and 13. It will be seen that the coil springs 20 cooperate with the coil springs 13 to resist downward movement of the forward end of the auxiliary frame and at the same time will aid in supporting the weight applied to the cushion 29.

Having thus described my invention, I claim:

1. A spring frame for seats comprising a main frame and a frame having one end hinged to the main frame, means for resiliently supporting the other end of the frame, said resilient supporting means tending to move the forward end of the frame upwardly, cushions supported by the main and auxiliary frames, one of said cushions having an edge resting on the resiliently supported end of the auxiliary frame.

2. A seat structure comprising a main frame and an auxiliary frame having one end hingedly connected with one end of the main frame, brackets connected to the adjacent forward ends of the main and auxiliary frames, springs connecting the brackets together and tending to move the forward end of the auxiliary frame upwardly from the main frame, coil springs, and means for connecting said coil springs between the forward end of the auxiliary frame and the rear end of the main frame.

3. A seat structure comprising a main frame and an auxiliary frame having one end hingedly connected with one end of the main frame, brackets connected to the adjacent forward ends of the main and auxiliary frames, springs connecting the brackets together and tending to move the forward end of the auxiliary frame upwardly from the main frame, coil springs connected to the rear end of the main frame, means for connecting said coil springs with the forward end of the auxiliary frame, cushions supported by the main frame and by the coil springs, and a cushion disposed across the main frame and having its forward edge resting on the forward edge of the auxiliary frame.

4. In a seat structure, a main frame, an auxiliary frame disposed within the main frame and having one end hingedly connected to the adjacent end of the main frame, springs connecting the lower edge of the front end of the movable frame with the upper edge of the front end of the main frame and tending to force the free end of the auxiliary frame upwardly from the main frame, means for limiting the upward movement of the auxiliary frame, horizontally disposed coil springs connected with the rear end of the main frame, and links connecting the other end of the springs with the forward end of the movable frame, said springs tending to force the forward end of the main spring upwardly, the rear ends of the horizontal coil springs being located above the hinge connection of the auxiliary frame, and cushions mounted on the coil springs and links and a cushion located upon the forward end of the main frame.

ALBERT WEICKMAN.